Patented Sept. 24, 1940

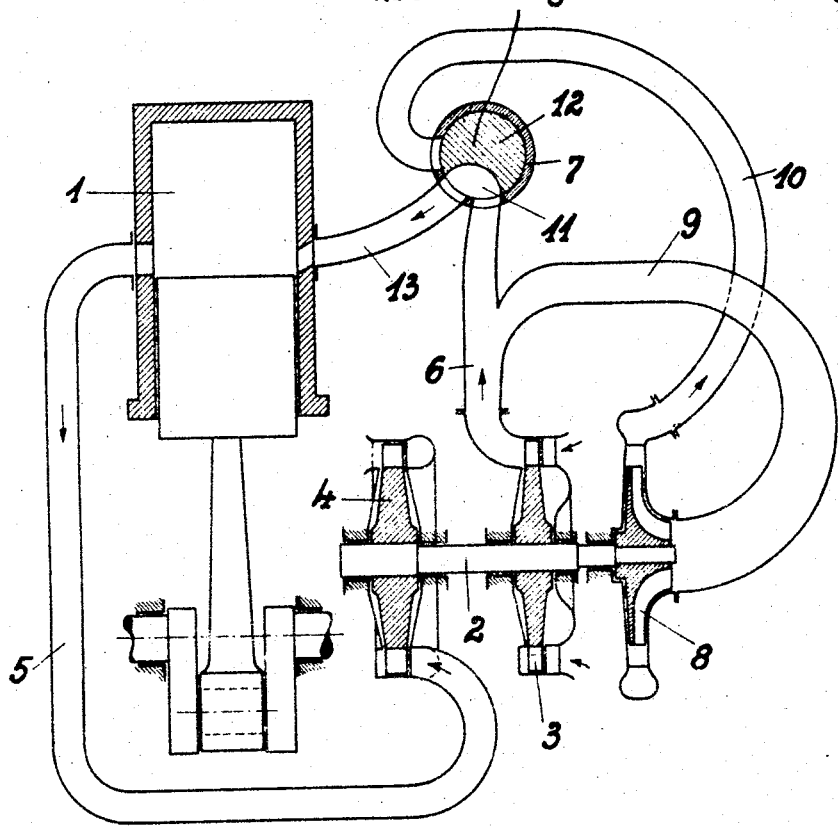

2,216,074

UNITED STATES PATENT OFFICE 2,216,074

INTERNAL COMBUSTION ENGINE

Alexander Garve and Oskar Kurtz, Augsburg, Germany, assignors to Maschinenfabrik Augsburg-Nürnberg A. G., Augsburg, Germany, a corporation of Germany Application October 24, 1938, Serial No. 236,647
In Germany November 9, 1937

5 Claims. (Cl. 123—65)

For loading internal combustion engines of ground-bound vehicles as well as of airplanes, Root's blowers and radial blowers are hitherto almost exclusively used for obtaining or generating the loading or charging air. But since in two-cycle internal combustion engines of high performance, for instance, airplane motors of highest performance very large quantities of air are needed for scavenging, it was found that radial blowers were hardly suited for this kind of engines. It has for this reason already been tried to make use of axial blowers for loaded two-cycle internal combustion engines. There arises however the disadvantage that for generating the more highly tensioned or compressed air, a relatively large number of blower stages are necessary since in axial blowers pressure rises from stage to stage only by low steps. The loading blowers would consequently be bulky and heavy.

According to the invention these disadvantages are avoided by generating the scavenging and the loading air by an aggregate of two blowers of different kind, that is an axial blower for generating large quantities of low-tensioned scavenging air, and a radial blower for generating a lesser quantity of high-tensioned loading air. The use of two different kinds of blowers in a joint air compressor is particularly advantageous because each blower may be used only for that portion of the air compression for which it is specially suitable. For instance in a compressor aggregate according to the invention, an axial blower having at most three stages is sufficient. The radial blower, if not sucking the air directly from the atmosphere, may draw it from the compression chamber of the axial blower. As there is always a sufficiently large quantity of air available, this may be done without materially interfering with the generation of scavenging air.

In the drawing a preferred form of the blower aggregate according to the invention is shown.

The scavenging air necessary for the scavenging of the cylinder 1 of a two-cycle internal combustion engine is generated by an axial blower 3 with, in the present case, a single stage. This blower is secured on a shaft 2 which is driven by a waste gas turbine 4 on the same shaft. The waste gases flow directly from the cylinder 1 through the piping 5 to the turbine 4. The low-tensioned scavenging air generated by the axial blower 3 is sent to the cylinder 1 through the piping 6 and the rotary slide valve 7. The radial blower 8 for generating the charging or supercharging air is also secured on the shaft 2 and draws the air through a branch piping 9 from the scavenging air piping 6. The more highly compressed air is directed to the cylinder 1 through the pressure piping 10 and the rotary slide valve 7. In order to effect this, the shaped-out portion 11 of the rotatable member 12 of the slide valve must first be got into position to connect the pipings 10 and 13.

Agreeable to the purpose the compressor aggregate is driven jointly by one and the same waste gas turbine; if however the loading is to be done only at intervals each separate blower may be driven by its own waste gas turbine or by any outside source of power.

We claim:

1. In combination, a two-cycle internal combustion engine cylinder, a radial blower for generating comparativly high pressure charging air for said cylinder, and a second blower for generating comparatively low pressure scavenging air for said cylinder, and with a much greater volumetric capacity output than said radial blower, said second blower having inlet and discharge passages and a series of rotatable blades providing an axial flow of air from the inlet passage to the discharge passage, and means supplying air compressed by said blowers to the cylinder.

2. In combination, a two-cycle internal combustion engine cylinder, a radial blower for generating comparatively high pressure charging air for said cylinder, and a second blower for generating comparatively low pressure scavenging air for said cylinder, and with a much greater volumetric capacity output than said radial blower, said second blower having inlet and discharge passages and a series of rotatable blades providing an axial flow of air from the inlet passage to the discharge passage, means supplying air compressed by said blowers to the cylinder, and an exhaust gas turbine operated by exhaust gases from said cylinder for driving said blowers.

3. In combination, a two-cycle internal combustion engine cylinder having an air supply opening, a radial blower for generating comparatively high pressure charging air for said cylinder, and a second blower for generating comparatively low pressure scavenging air for said cylinder, and with a much greater volumetric capacity output than said radial blower, said second blower having inlet and discharge passages and a series of rotatable blades providing an axial flow of air from the inlet passage to the discharge passage, an air supply pipe communicating with the air supply opening of the cylinder, and a valve operable to connect said pipe either to the output side of the radial blower or to the output side of the second blower.

4. In combination, a two-cycle internal combustion engine cylinder having an air supply opening, a radial blower for generating comparatively high pressure charging air for said cylinder, and a second blower for generating comparatively low pressure scavenging air for said cylinder, and with a much greater volumetric capacity output than said radial blower, said second blower having inlet and discharge passages and a series of rotatable blades providing an axial flow of air from the inlet passage to the discharge passage, a pipe connecting the discharge passage of the second blower to the inlet passage of the radial blower, an air supply pipe communicating with the air supply opening of the cylinder, a valve operable to connect said last-mentioned pipe either to the outut side of the radial blower or to the output side of the second blower, and an exhaust gas turbine operated by exhaust gases from said cylinder for driving said blowers.

5. In combination, a two-cycle internal combustion engine cylinder, a radial blower for generating comparatively high pressure charging air for said cylinder, and a second blower for generating comparatively low pressure scavenging air for said cylinder, and with a much greater volumetric capacity output than said radial blower, said second blower having inlet and discharge passages and a series of rotatable blades providing an axial flow of air from the inlet passage to the discharge passage, a pipe connecting the discharge passage of the second blower to the inlet passage of the radial blower, means supplying air compressed by said blowers to the cylinder, and an exhaust gas turbine operated by exhaust gases from said cylinder for driving said blowers.

ALEXANDER GARVE.
OSKAR KURTZ.